US009035008B2

(12) United States Patent
Yang et al.

(10) Patent No.: US 9,035,008 B2
(45) Date of Patent: May 19, 2015

(54) CURABLE-ON-DEMAND POLYSILOXANE COATING COMPOSITION

(71) Applicant: 3M INNOVATIVE PROPERTIES COMPANY, St. Paul, MN (US)

(72) Inventors: Yu Yang, Eden Prairie, MN (US); George G. I. Moore, Afton, MN (US); Michael A. Semonick, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/368,515

(22) PCT Filed: Dec. 21, 2012

(86) PCT No.: PCT/US2012/071299
§ 371 (c)(1),
(2) Date: Jun. 25, 2014

(87) PCT Pub. No.: WO2013/101742
PCT Pub. Date: Jul. 4, 2013

(65) Prior Publication Data
US 2014/0349125 A1 Nov. 27, 2014

Related U.S. Application Data

(60) Provisional application No. 61/581,257, filed on Dec. 29, 2011.

(51) Int. Cl.
| C09D 183/04 | (2006.01) |
| C08G 77/08 | (2006.01) |
| C09D 183/06 | (2006.01) |
| B01J 31/02 | (2006.01) |
| C09J 7/02 | (2006.01) |
| C08G 77/12 | (2006.01) |
| C08G 77/16 | (2006.01) |
| C08L 83/04 | (2006.01) |
| C08K 5/29 | (2006.01) |
| C08K 5/31 | (2006.01) |
| C08K 5/5399 | (2006.01) |

(52) U.S. Cl.
CPC ........... *C09D 183/06* (2013.01); *B01J 31/0251* (2013.01); *B01J 31/0265* (2013.01); *C09D 183/04* (2013.01); *C09J 7/02* (2013.01); *C08G 77/08* (2013.01); *C08G 77/12* (2013.01); *C08G 77/16* (2013.01); *C08L 83/04* (2013.01); *C09J 7/025* (2013.01); *C09J 2483/005* (2013.01); *C08K 5/29* (2013.01); *C08K 5/31* (2013.01); *C08K 5/5399* (2013.01)

(58) Field of Classification Search
None
See application file for complete search history.

(56) References Cited

U.S. PATENT DOCUMENTS

| 2,708,289 A | 5/1955 | Collings |
| 3,328,482 A | 6/1967 | Northrup et al. |
| 3,445,417 A | 5/1969 | Layne et al. |
| 3,628,996 A | 12/1971 | Weber |
| 3,969,543 A | 7/1976 | Roberts et al. |
| 4,181,752 A | 1/1980 | Martens et al. |
| 4,262,157 A | 4/1981 | Hori et al. |
| 4,269,963 A | 5/1981 | Homan et al. |
| 4,489,199 A | 12/1984 | Wengrovius |
| 4,515,932 A | 5/1985 | Chung |
| 4,761,443 A | 8/1988 | Lopes |
| 5,176,984 A | 1/1993 | Hipps, Sr. et al. |
| 5,219,958 A | 6/1993 | Noomen et al. |
| 5,229,212 A | 7/1993 | Reed |
| 5,286,815 A | 2/1994 | Leir et al. |
| 5,371,162 A | 12/1994 | Konings et al. |
| 5,403,909 A | 4/1995 | Rubinsztajn |
| 5,484,873 A | 1/1996 | Johnson |
| 5,514,728 A | 5/1996 | Lamanna et al. |
| 5,688,888 A | 11/1997 | Burkus, II et al. |
| 5,789,460 A | 8/1998 | Harkness et al. |
| 5,820,944 A | 10/1998 | Harkness et al. |

(Continued)

FOREIGN PATENT DOCUMENTS

| EP | 0 109 772 B1 | 9/1987 |
| EP | 0 444 633 A2 | 9/1991 |

(Continued)

OTHER PUBLICATIONS

Arenivar, "Bismuth Carboxylates for Polyurethane Catalysis," *Polyurethanes 89*, Proceedings of the SPI 32$^{nd}$ Annual Technical Marketing Conference, Oct. 1-4, 1989, pp. 623-627.

(Continued)

*Primary Examiner* — Marc Zimmer
(74) *Attorney, Agent, or Firm* — Lucy C. Weiss

(57) ABSTRACT

A curable composition comprises (a) at least one polyorganosiloxane, fluorinated polyorganosiloxane, or combination thereof comprising reactive silane functionality comprising at least two hydroxysilyl moieties; (b) at least one polyorganosiloxane, fluorinated polyorganosiloxane, or combination thereof comprising reactive silane functionality comprising at least two hydrosilyl moieties; and (c) at least one photoactivatable composition comprising at least one organoborate salt selected from tetraarylborate, triarylorganoborate, diaryldiorganoborate, and aryltriorganoborate salts (and combinations thereof) of at least one base selected from amidines, guanidines, phosphazenes, proazaphosphatranes, and combinations thereof; wherein at least one of the components (a) and (b) has an average reactive silane functionality of at least three.

20 Claims, No Drawings

(56) References Cited

U.S. PATENT DOCUMENTS

| | | |
|---|---|---|
| 5,866,222 A | 2/1999 | Seth et al. |
| 5,891,529 A | 4/1999 | Harkness et al. |
| 6,013,682 A | 1/2000 | Dalle et al. |
| 6,096,483 A | 8/2000 | Harkness et al. |
| 6,124,371 A | 9/2000 | Stanssens et al. |
| 6,136,996 A | 10/2000 | Rubinsztajn et al. |
| 6,166,207 A | 12/2000 | Friedrich et al. |
| 6,204,350 B1 | 3/2001 | Liu et al. |
| 6,235,832 B1 | 5/2001 | Deng et al. |
| 6,277,986 B1 | 8/2001 | Hall-Goulle et al. |
| 6,423,378 B1 | 7/2002 | Cotting et al. |
| 6,551,761 B1 | 4/2003 | Hall-Goulle et al. |
| 6,740,717 B2 | 5/2004 | Moren |
| 6,777,512 B1 | 8/2004 | Sonnenschein et al. |
| 6,780,484 B2 | 8/2004 | Kobe et al. |
| 6,805,933 B2 | 10/2004 | Patel et al. |
| 6,835,422 B2 | 12/2004 | Kobe et al. |
| 7,064,173 B2 | 6/2006 | Rubinsztajn et al. |
| 7,148,370 B1 | 12/2006 | Rubinsztajn et al. |
| 7,300,747 B2 | 11/2007 | Okazaki et al. |
| 7,332,541 B2 | 2/2008 | Schindler et al. |
| 7,482,391 B1 | 1/2009 | Cross et al. |
| 7,538,104 B2 | 5/2009 | Baudin et al. |
| 8,470,899 B2 | 6/2013 | Maliverney |
| 2001/0037008 A1 | 11/2001 | Sherman et al. |
| 2003/0139287 A1 | 7/2003 | Deforth et al. |
| 2004/0242867 A1 | 12/2004 | Baudin et al. |
| 2006/0014844 A1 | 1/2006 | Lim et al. |
| 2006/0111505 A1 | 5/2006 | Schindler et al. |
| 2006/0247341 A1 | 11/2006 | Hsieh et al. |
| 2009/0171025 A1 | 7/2009 | Matsushita et al. |
| 2010/0036049 A1 | 2/2010 | Matsushita et al. |
| 2010/0041810 A1 | 2/2010 | Wakabayashi et al. |
| 2010/0168454 A1 | 7/2010 | Jiang et al. |
| 2011/0028585 A1 | 2/2011 | Shiraishi et al. |
| 2011/0098392 A1 | 4/2011 | Barrandon et al. |
| 2011/0098420 A1* | 4/2011 | Takizawa et al. ............ 525/477 |
| 2012/0264056 A1* | 10/2012 | Lin et al. .................... 430/281.1 |
| 2013/0101840 A1 | 4/2013 | Yang et al. |
| 2013/0101841 A1 | 4/2013 | Yang et al. |
| 2013/0102728 A1 | 4/2013 | Yang et al. |
| 2013/0142962 A1 | 6/2013 | Templeman |
| 2013/0178553 A1 | 7/2013 | Yang et al. |
| 2014/0329926 A1* | 11/2014 | Kirino ............................. 522/14 |

FOREIGN PATENT DOCUMENTS

| | | |
|---|---|---|
| EP | 0 268 982 B1 | 3/1992 |
| EP | 0 698 633 A2 | 2/1996 |
| EP | 0 459 500 B1 | 3/1997 |
| JP | 61022094 A | 1/1986 |
| WO | WO2004/022618 A1 | 3/2004 |
| WO | WO2007/149422 A2 | 12/2007 |
| WO | WO 2009/122664 A1 | 10/2009 |
| WO | WO 2010/146254 A1 | 12/2010 |
| WO | WO 2010/149869 A1 | 12/2010 |
| WO | WO 2012/003152 A1 | 1/2012 |
| WO | WO 2013/096554 A1 | 6/2013 |
| WO | WO 2013/101477 A1 | 7/2013 |
| WO | WO 2013/106193 A1 | 7/2013 |

OTHER PUBLICATIONS

Fournier et al., "1,8-Diazabicyclo[5.4.0]undec-7-ene (DBU) as Ligand for Atom Transfer Radical Polymerization (ATRP)," *European Polymer Journal*, vol. 41 (2005), pp. 1576-1581.

Hartman et al., Bis- and Tris(Amidine)Fluoroboron Cations and Mixed Tetrahaloborate Anions: NMR Studies of Mixed Boron Trihalide Adduct Redistribution Reactions Involving Amidines as Strong Nitrogen Bases, *Can. J. Chem.*, vol. 74, (1996), pp. 2131-2142.

Kim et al., "Cure Kinetics of Biphenyl Epoxy Resin System Using Latent Catalysts," *Journal of Applied Polymer Science*, vol. 81, (2001), pp. 2711-2720.

Li et al., "Novel Organic-Inorganic Hybrid Coordination Polymer [(DBU-H)(PbI$_3$)]$_n$: Synthesis, Crystallographic Structure and Quantum Chemical Investigation," *Chinese Journal of Chemistry*, vol. 23, (2005), pp. 1391-1396.

Pérez et al., "Efficient and Clean Synthesis of N-alkyl Carbamates by Transcarboxylation and O-alkylation Coupled Reactions Using a DBU-CO$_2$ Zwitterionic Carbamic Complex in Aprotic Polar Media," *Tetrahedron Letters*, vol. 43, (2002), pp. 4091-4093.

Del Sole et al., "First Evidence of Formation of Stable DBU Zn-Phthalocyanine Complexes: Synthesis and Characterization," *Journal of Porphyrins and Phthalocyanines*, vol. 9, (2005), pp. 519-527.

Org. Lett. 9, No. 1, (2007), pp. 1-169.

E. Lukevics and M. Dzintara, "Silylation of Hydroxyl-Containing Compounds with Aryl and Heteroaryl-Hydrosilanes in the Presence of Amines," Journal of Organometallic Chemistry 271, pp. 307-317 (1984).

Kanji et al., "Quaternary Ammonium Salt as DBU-Generating Photobase Generator", Journal of Photopolymer Science and Technology, 19(1), 81-84 (Jan. 1, 2006).

Chemtob et al., "UV-Activated Silicone Oligomer Cross-Linking Through Photoacid and Photobase Organocatalysts," *J. Appl. Polym. Sci.* 2013, 6 pages.

Suyama et al., "Photobase Generators: Recent Progress and Application Trend in Polymer Systems," *Progress in Polymer Science* 34 (2009) pp. 194-209.

"Peel Adhesion of Pressure Sensitive Tape," Pressure Sensitive Tape Council PSTC-101 Method D (Rev 05/07).

International Search Report for PCT Application No. PCT/US2012/071299, filed Dec. 21, 2012, 3 pp.

Sun et al., "Bicyclic Guanidinium Tetraphenylborate: A Photobase Generator and a Photocatalyst for Living Anionic Ring-Opening Polymerization and Cross-Linking of Polymeric Materials Containing Ester and Hydroxy Groups," *J. Am. Chem. Soc.*, 130, (2008), pp. 8130-8131.

Rodima et al., "Acid-Base Equilibria in Nonpolar Media. 2.[1] Self-Consistent Basicity Scale in THF Solution Ranging from 2-Methoxypyridine to EtP$_1$(pyrr) Phosphazene," *J. Org. Chem.*, vol. 67, No. (6), (2002), pp. 1873-1881.

Dietliker et al.,"Advancements in Photolatent Amines: Expanding the Scope of Photolatent Base Technology," *Technical Conference Proceedings, RadTech UV & EB 2008 Technology Expo & Conference*, May 4-7, 2008, Chicago, Illinois.

Schebler et al., "Phenyltris(*tert*-butylthio)methyl)borate: A Second Generation S$_3$$^-$ Ligand That Enforces Tetrahedral Coordination," *Inorg. Chem.*, 37, (1998), pp. 4754-4755.

\* cited by examiner

CURABLE-ON-DEMAND POLYSILOXANE COATING COMPOSITION

STATEMENT OF PRIORITY

This application claims the priority of U.S. Provisional Application No. 61/581,257, filed Dec. 29, 2011; the contents of which are hereby incorporated by reference.

FIELD

This invention relates to curable coating compositions comprising reactive silane functionality and, in other aspects, to processes for coating the compositions and articles prepared thereby.

BACKGROUND

Moisture-curable polysiloxane compositions cure in the presence of moisture to form crosslinked materials such as release coatings and surface treatments that are useful in many industries. For example, a polysiloxane or fluorinated polysiloxane is often selected to provide moisture-curable release coatings suitable for use with pressure-sensitive adhesives. The moisture for curing is typically obtained from the atmosphere or from a substrate to which the composition has been applied, although it can also be added to the composition (for example, to enable curing in depth or in confinement).

Moisture-curable polysiloxane compositions usually comprise siloxane polymers having groups (for example, alkoxysilyl or acyloxysilyl moieties) that can react in the presence of moisture to form cured (that is, crosslinked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form silanol compounds having hydroxysilyl groups. In the second reaction, the hydroxysilyl groups condense with other hydroxysilyl, alkoxysilyl, or acyloxysilyl groups in the presence of a catalyst to form —Si—O—Si— linkages. The two reactions occur essentially simultaneously upon generation of the silanol compound. Commonly used catalysts for the two reactions include Bronsted and Lewis acids. A single material can catalyze both reactions.

Preferably, the hydrolysis and condensation reactions proceed quickly after the moisture-curable composition has been applied, for example, to a substrate. At the same time, however, the reactions must not occur prematurely, for example, during processing or storage.

A good balance between these properties is often difficult to obtain, as rapid reactivity and storage stability are opposite properties to each other. For example, highly active catalysts such as tetraalkyl titanate esters rapidly accelerate the moisture-curing reaction but, at the same time, can make it difficult to process the materials without risking premature gelation in feed tanks, coating equipment, and other manufacturing and handling apparatus. Control of the amount of moisture can be critical, with too little moisture potentially resulting in slow or incomplete cure and too much moisture resulting in premature cure.

A variety of approaches have been used for providing moisture-curable compositions that have acceptable cure rates without processing and storage difficulties. For example, two-part systems have been developed (one part comprising a functional siloxane polymer and the other part comprising a catalyst), with the two parts being mixed immediately prior to use. While this approach has been useful in small-scale applications, it has been less efficient for large-scale manufacturing, where delays caused by having to mix the two parts have been undesirable. Furthermore, coating operations must be completed expeditiously before the composition cures in the pot, and this has been difficult when working with large surface area substrates or a large volume of composition.

Ammonium salt catalysts have been developed that are inactive until heated sufficiently to liberate an acid compound that initiates the moisture curing reaction. Liberation of the acid also generates an amine, however, that must be removed by evaporation. In addition, the heat used to activate the catalyst can damage heat-sensitive substrates onto which the composition has been applied.

Other materials (for example, onium salts such as sulfonium and iodonium salts) have been used to generate acid species in situ upon irradiation (for example, irradiation with ultraviolet light). Such materials have not required heat activation and therefore have enabled the use of heat-sensitive substrates without damage (and without the production of undesirable species requiring removal), but the materials have been relatively expensive, have required moisture control, and have exhibited cure inhibition on some substrates.

Conventional tin catalysts such as dibutyl tin dilaurate can provide stable curable polysiloxane compositions that can be processed and coated without premature gelation. In addition to typical moisture-curable systems, it has been found that curable compositions comprising dual reactive silane functionality in the form of hydrosilyl and hydroxysilyl groups (dehydrogenatively-curable systems) can be cured by using tin catalysts. The compositions have been widely used for pressure-sensitive adhesive and mold release applications but have sometimes suffered from relatively short pot lives. In addition, the use of tin catalysts is becoming particularly problematic because the organotin compounds generally employed as catalysts are now considered to be toxicologically objectionable.

Acceleration of cure has been achieved by the use of compounds such as diorganosulfoxides, imidazoles, and amines (including amidines and substituted guanidines) in combination with tin catalysts (and, in some cases, amine compounds alone) in various silicone compositions (including room temperature vulcanizing silicone compositions and dehydrogenatively-cured silicone compositions). Amine compounds including amidines have also been proposed for use in the absence of tin catalysts for curing moisture-curable, silyl-functional organic polymers, but practical curability of alkoxysilyl-functional organic polymers and acceptable adhesion to substrates were achieved only with strongly basic amines (those exhibiting a pH of at least 13.4 in aqueous solution).

SUMMARY

Thus, we recognize that there exists an ongoing need for curable polysiloxane compositions that can provide acceptable cure rates without significant processing and storage difficulties (for example, due to premature gelation). Preferably, these compositions will be efficiently processable (for example, without the need for mixing of a two-part system prior to cure), will employ catalysts that do not generate species requiring removal, and/or will not require heat activation (so as to enable curing at relatively low temperatures and/or the use of heat-sensitive substrates). The compositions preferably will employ catalysts that are relatively non-toxic, provide compositions that are relatively stable in solution but relatively fast-curing upon drying, effective in relatively low concentrations, and/or effective under relatively low (or no)

moisture conditions. Ideally, the compositions will be curable on demand (for example, by generation of the catalyst in situ) and coatable without the need for significant addition of solvent (for example, in 100 percent solids form).

Briefly, in one aspect, this invention provides a curable polysiloxane composition comprising dual reactive silane functionality. The composition comprises
 (a) at least one polyorganosiloxane, fluorinated polyorganosiloxane, or combination thereof comprising reactive silane functionality comprising at least two hydroxysilyl moieties (that is, monovalent moieties comprising a hydroxyl group bonded directly to a silicon atom);
 (b) at least one polyorganosiloxane, fluorinated polyorganosiloxane, or combination thereof comprising reactive silane functionality comprising at least two hydrosilyl moieties (that is, monovalent moieties comprising a hydrogen atom bonded directly to a silicon atom); and
 (c) at least one photoactivatable composition comprising at least one organoborate salt selected from tetraarylborate, triarylorganoborate, diaryldiorganoborate, and aryltriorganoborate salts (and combinations thereof) of at least one base selected from amidines, guanidines, phosphazenes, proazaphosphatranes, and combinations thereof;
wherein at least one of components (a) and (b) has an average reactive silane functionality of at least three (that is, component (a) has at least three hydroxysilyl moieties (on average), component (b) has at least three hydrosilyl moieties (on average), or both).

Components (a) and (b) preferably comprise at least one polyorganosiloxane (more preferably, at least one polyalkylsiloxane (that is, at least one polydialkylsiloxane, polyalkyl(hydro)siloxane, or a combination thereof); most preferably, at least one polymethylsiloxane (that is, at least one polydimethylsiloxane, polymethyl(hydro)siloxane, or a combination thereof)) having the above-specified reactive silane functionalities, respectively. Preferably, component (a) is hydroxyl-endblocked, so as to comprise two terminal hydroxysilyl moieties (on average).

Upon exposure of the photoactivatable composition to radiation, the base can be generated in situ to catalyze the curing of the polysiloxane components of the curable polysiloxane composition. The photoactivatable composition preferably comprises at least one organoborate salt selected from tetraarylborate, triarylorganoborate, and diaryldiorganoborate salts of the base, and combinations thereof (more preferably, selected from tetraarylborate and triarylorganoborate salts of the base, and combinations thereof; most preferably, selected from tetraarylborate salts of the base, and combinations thereof). The base that is generated upon exposure of the photoactivatable composition to radiation preferably comprises at least one amidine or guanidine (most preferably, 1,8-diazabicyclo[5.4.0]-7-undecene (DBU)).

It has been discovered that, unlike standard amine bases such as 4,4'-trimethylenebis(1-methylpiperidine) (which are ineffective), the above-described bases can effectively catalyze the curing (apparently, by dehydrocondensation) of polysiloxane compositions comprising reactive silane functionality in the form of hydrosilyl and hydroxysilyl moieties. It has been further discovered that photoactivatable compositions can be effectively used to generate the bases in situ. This in situ generation has been found to provide curable-on-demand polysiloxane compositions that can exhibit enhanced storage stability and/or pot life and that can be coated in completely solvent-free (that is, 100 percent solids) or substantially solvent-free (using only a relatively small amount of solvent) form.

Upon photoactivation, the curable polysiloxane compositions can cure relatively rapidly (for example, upon irradiation curing can occur within periods of time as short as seconds or less) even at temperatures as low as ambient (for example, about 23° C.), without the need for heat activation, and the photoactivatable compositions can be effective in relatively small amounts (for example, at concentrations as low as about 0.5 weight percent or less, based upon the total weight of components (a), (b), and (c)). Thus, curable polysiloxane compositions comprising the photoactivatable compositions can be suitable for use in high speed coating and curing operations in an industrial setting, without the need for addition of heat. In spite of such effective curability, the curable polysiloxane compositions can exhibit relatively good storage stability (for example, for a period of weeks or more in a closed container) and/or relatively long pot life (for example, on the order of days in the absence of light) in 100 percent solids form or, optionally, in a variety of solvents (for example, heptane, methyl ethyl ketone, or a combination thereof), without the need for mixing of a two-part system immediately prior to use.

In surprising contrast with prior art compositions, the in situ-generated bases can be effective in the curable polysiloxane composition of the invention in the substantial absence of other condensation catalysts and/or in the substantial absence of moisture. The bases can be used as substitutes for conventional tin catalysts to provide organometallic catalyst-free, curable polysiloxane compositions, without the need for changes in the nature of the polysiloxane components of conventional tin-cured polysiloxane compositions (for example, release coating compositions such as Syl-Off™ 292 coating composition, available from Dow Corning Corporation, Midland, Mich.). Unlike the conventional tin catalysts, at least some of the bases (for example, DBU) and their photoactivatable precursors are relatively non-toxic and non-persistent and therefore suitable for use in preparing relatively environmentally friendly or "green" polysiloxane compositions.

The curable polysiloxane composition of the invention can be cured to provide crosslinked networks having properties that can be tailored to the requirements of various different applications (for example, by varying the natures, relative amounts, and/or degrees of reactive silane functionality of starting components (a) and/or (b)). Thus, the curable polysiloxane composition can be used to provide coatings having a variety of surface properties for use in numerous coating applications (for example, use as release coatings for pressure-sensitive adhesives, protective coatings, water- and/or oil-repellent coatings or surface treatments, and the like). The curable polysiloxane composition of the invention can be particularly useful in relatively sensitive applications requiring careful and/or tailored control of surface properties (for example, release coating applications), as the products of photolysis (namely, the base catalysts and other photolytic byproducts) do not appear to constitute or produce species requiring removal and, in some embodiments, are sufficiently volatile to be evaporated from the composition during processing, thereby leaving essentially no catalyst contamination in the cured material (in contrast with the metal contamination of conventional tin catalysts, which can be particularly problematic in the area of electronics).

In view of the foregoing, at least some embodiments of the curable polysiloxane composition of the invention meet the above-described, ongoing need for curable-on-demand, solvent-free compositions that can provide acceptable (or even exceptional) cure rates without significant processing and storage difficulties (for example, without the need for mixing of a two-part system prior to cure, for contaminant removal, and/or for heat activation). At least some embodiments of the curable polysiloxane composition also employ base catalysts and corresponding photoactivatable precursors that are relatively non-toxic, while being effective in relatively low concentrations and/or under relatively low (or no) moisture conditions.

In another aspect, this invention also provides a coating process comprising (a) providing the above-described curable polysiloxane composition of the invention;

(b) providing at least one substrate having at least one major surface;

(c) applying the curable polysiloxane composition to at least a portion of at least one major surface of the substrate; and (d) inducing the curable polysiloxane composition to cure to form a coating by exposing at least a portion of the curable polysiloxane composition to radiation.

In yet another aspect, this invention provides an article comprising at least one substrate having at least one major surface, the substrate bearing, on at least a portion of at least one major surface, a coating prepared by the above-described coating process.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

As used herein, the term "and/or" means one or all of the listed elements or a combination of any two or more of the listed elements.

The words "preferred" and "preferably" refer to embodiments of the invention that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the invention.

The term "comprises" and variations thereof do not have a limiting meaning where these terms appear in the description and claims.

As used herein, "a," "an," "the," "at least one," and "one or more" are used interchangeably.

The above "Summary of the Invention" section is not intended to describe every embodiment or every implementation of the invention. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

Definitions

As used in this patent application:

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"cure" means conversion to a crosslinked polymer network (for example, through catalysis);

"cyano" means a monovalent group of formula —CN;

"fluoro-" (for example, in reference to a group or moiety, such as in the case of "fluoroalkylene" or "fluoroalkyl" or "fluorocarbon") or "fluorinated" means only partially fluorinated such that there is at least one carbon-bonded hydrogen atom;

"fluorochemical" means fluorinated or perfluorinated;

"heteroorganic" means an organic group or moiety (for example, an alkyl or alkylene group) containing at least one heteroatom (preferably, at least one catenated heteroatom);

"hydrosilyl" refers to a monovalent moiety or group comprising a silicon atom directly bonded to a hydrogen atom (for example, the hydrosilyl moiety can be of formula —Si(R)$_{3-p}$(H)$_p$, where p is an integer of 1, 2, or 3 and R is a hydrolyzable or non-hydrolyzable group (preferably, non-hydrolyzable) such as alkyl or aryl);

"hydroxysilyl" refers to a monovalent moiety or group comprising a silicon atom directly bonded to a hydroxyl group (for example, the hydroxysilyl moiety can be of formula —Si(R)$_{3-p}$(OH)$_p$ where p is an integer of 1, 2, or 3 and R is a hydrolyzable or non-hydrolyzable group (preferably, non-hydrolyzable) such as alkyl or aryl);

"mercapto" means a monovalent group or moiety of formula —SH;

"oligomer" means a molecule that comprises at least two repeat units and that has a molecular weight less than its entanglement molecular weight; such a molecule, unlike a polymer, exhibits a significant change in properties upon the removal or addition of a single repeat unit;

"oxy" means a divalent group or moiety of formula —O—;

"perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine; and "thio" means a divalent group of formula —S—.

Component (a)

Polysiloxanes suitable for use as component (a) of the curable polysiloxane composition of the invention include polyorganosiloxanes, fluorinated polyorganosiloxanes, and combinations thereof (preferably, polyorganosiloxanes; more preferably, polydialkylsiloxanes) comprising reactive silane functionality comprising at least two hydroxysilyl moieties (that is, monovalent moieties comprising a hydroxyl group bonded directly to a silicon atom). The polysiloxanes can be oligomers, polymers, or a combination thereof. Preferably, the polysiloxanes are polymers, which can be linear, branched, or cyclic. Useful polymers include those that have random, alternating, block, or graft structures, or a combination thereof.

The molecular weight and the reactive silane functionality of component (a) (including the number and nature of the hydroxysilyl moieties) of the polysiloxanes can vary widely, depending upon, for example, the molecular weight and the reactive silane functionality of component (b) and the properties desired for the curable and/or cured composition. At least one of components (a) and (b) has an average reactive silane functionality of at least three, however (that is, component (a) has at least three hydroxysilyl moieties (on average), component (b) has at least three hydrosilyl moieties (on average), or both), so as to enable the formation of a crosslinked network.

Preferably, the polyorganosiloxanes, fluorinated polyorganosiloxanes, and combinations thereof used for component (a) are hydroxyl-endblocked, so as to comprise two terminal hydroxysilyl moieties (on average). The polysiloxanes preferably have a weight average molecular weight of about 150 to about 1,000,000 (more preferably, about 1,000 to about 1,000,000).

A preferred class of useful polysiloxanes includes those that can be represented by the following general formula:

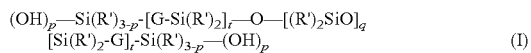

$$(OH)_p-Si(R')_{3-p}-[G-Si(R')_2]_t-O-[(R')_2SiO]_q [Si(R')_2-G]_t-Si(R')_{3-p}-(OH)_p \quad (I)$$

wherein each p is independently an integer of 1, 2, or 3 (preferably, 1); each G is independently a divalent linking group; each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; q is an integer of 0 to about 15,000 (preferably, about 20 to about 15,000); and each t is independently an integer of 0 or 1 (preferably, 0). Preferably, each R' is independently selected from alkyl (preferably, having 1 to about 8 carbon atoms), fluoroalkyl (preferably, having 3 to about 8 carbon atoms; more preferably, $R_fC_2H_4-$, wherein $R_f$ is a fluorinated or perfluorinated alkyl group having 1 to about 6 carbon atoms (preferably, 1 to about 6 carbon atoms)), aryl, and combinations thereof (with alkyl being most preferred). More preferably, each R' is independently selected from methyl, $C_4F_9C_2H_4-$, $C_6F_{13}C_2H_4-$, $CF_3C_2H_4-$, $C_6H_5C_2H_4-$, phenyl, and combinations thereof (even more preferably, methyl, $CF_3C_2H_4-$, phenyl, $C_4F_9C_2H_4-$, and combinations thereof; most preferably, methyl). Each divalent linking group, G, is preferably independently selected from oxy, alkylene, arylene, heteroalkylene, heteroarylene, cycloalkylene, heterocycloalkylene, and combinations thereof (more preferably, selected from oxy, alkylene, arylene, and combinations thereof). Heteroatoms (in G and/or R') can include oxygen, sulfur, nitrogen, phosphorus, and combinations thereof (preferably, oxygen, sulfur, and combinations thereof; more preferably, oxygen). G can contain fluorine, provided that it is separated from silicon by at least two carbon atoms.

Preferred polysiloxanes include hydroxy-endblocked polydimethylsiloxane homopolymer, as well as hydroxyl-endblocked copolymers comprising dimethylsiloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl)(methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof.

The polysiloxanes useful as component (a) can be used in the curable composition of the invention singly or in the form of mixtures of different polysiloxanes. Sometimes mixtures can be preferred. A preferred composition for use as component (a) comprises a mixture of (1) at least one polyorganosiloxane, fluorinated polyorganosiloxane, or combination thereof (preferably, at least one polyorganosiloxane) having a weight average molecular weight in the range of about 300,000 to about 1,000,000 (more preferably, about 400,000 to about 900,000; most preferably, about 500,000 to about 700,000) and (2) at least one polyorganosiloxane, fluorinated polyorganosiloxane, or combination thereof (preferably, at least one polyorganosiloxane) having a weight average molecular weight in the range of about 150 to about 150,000 (more preferably, about 10,000 to about 120,000; most preferably, about 10,000 to about 15,000). The relative amounts of component (1) and component (2) and their molecular weights can be selected for release applications according to the nature of the adhesive (or other material) to be utilized and the level of release desired.

For example, for mold release applications, the weight ratio of the former polysiloxane to the latter polysiloxane can range from about 3:1 to about 19:1 (preferably, about 4:1 to about 9:1; more preferably, about 6:1). For pressure sensitive adhesive (PSA) release applications, the weight ratio of the former polysiloxane to the latter polysiloxane can range, for example, from about 2:1 to about 1:10 (preferably, about 1:1 to about 1:6; more preferably, about 1:2 to about 1:4).

The polysiloxanes suitable for use as component (a) can be prepared by known synthetic methods and many are commercially available. For example, the hydroxysilyl-functional components of Syl-Off™ 292 coating composition (available from Dow Corning Corporation, Midland, Mich.) are preferred polysiloxanes, and other useful polysiloxanes of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Component (b)

Polysiloxanes suitable for use as crosslinker component (b) of the curable composition of the invention include polyorganosiloxanes, fluorinated polyorganosiloxanes, and combinations thereof (preferably, polyorganosiloxanes; more preferably, polyalkyl(hydro)siloxanes) comprising reactive silane functionality comprising at least two hydrosilyl moieties (that is, monovalent moieties comprising a hydrogen atom bonded directly to a silicon atom). The polysiloxanes can be small molecules, oligomers, polymers, or a combination thereof. Preferably, the polysiloxanes are polymers. The polysiloxanes can be linear, branched, or cyclic. Useful polymers include those that have random, alternating, block, or graft structures, or a combination thereof.

The molecular weight and the reactive silane functionality of component (b) (including the number and nature of the hydrosilyl moieties) can vary widely, depending upon, for example, the molecular weight and the reactive silane functionality of component (a) and the properties desired for the curable and/or cured composition. Preferably, component (b) has an average reactive silane functionality of at least three (so as to enable the formation of a crosslinked network when component (a) is hydroxyl-endblocked). The polysiloxanes preferably have a weight average molecular weight of about 100 to about 100,000.

A preferred class of polysiloxanes includes those that can be represented by the following general formula:

$$R'_2R''SiO(R'_2SiO)_r(HR'SiO)_sSiR''R'_2 \quad (II)$$

wherein R' is as defined above for Formula (I); each R'' is independently hydrogen (hydro) or R'; r is an integer of 0 to about 150 (preferably, 0 to about 100; more preferably, 0 to about 20); and s is an integer of 2 to about 150 (preferably, about 5 to about 100; more preferably, about 20 to about 80). Most preferably, both R'' and R' are methyl, r is 0, and/or s is about 40.

Preferred hydride-functional polysiloxanes include those comprising polymethyl(hydro)siloxane homopolymer, as well as those comprising copolymer(s) comprising methyl (hydro)siloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), di(fluoroalkyl)siloxane units, (fluoroalkyl)(methyl)siloxane units, and (fluoroalkyl)(phenyl)siloxane units wherein each fluoroalkyl group is independently selected from fluoroalkyl groups having 3 to about 8 carbon atoms (for example, trifluoropropyl or nonafluorohexyl), diphenylsiloxane units, and combinations thereof. Although homopolymer is often preferred, copolymers can be preferred for some applications.

The polysiloxanes useful as component (b) can be used in the curable composition of the invention singly or in the form of mixtures of different polysiloxanes. The polysiloxanes can be prepared by known synthetic methods and many are commercially available. For example, Syl-Off™ Q2-7560 crosslinker, Syl-Off™ 7678 crosslinker, and the hydrosilyl-functional component (for example, Syl-Off™ 7048 crosslinker) of Syl-Off™ 292 and Syl-Off™ 294 coating compositions (all available from Dow Corning Corporation, Midland, Mich.) are preferred polysiloxanes, and other useful polysiloxane crosslinkers of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

Component (c)

Photoactivatable compositions suitable for use as component (c) of the curable composition of the invention include organoborate salt compositions (known or hereafter-developed compounds or mixtures) that, upon exposure to radiation (preferably, ultraviolet radiation, visible radiation, or a combination thereof), generate at least one base selected from amidines, guanidines (including substituted guanidines such as biguanides), phosphazenes, proazaphosphatranes (also known as Verkade's bases), and combinations thereof. Preferred photoactivatable compositions include those organoborate salt compositions that, upon exposure to radiation, generate at least one base selected from amidines, guanidines, and combinations thereof (more preferably, cyclic amidines, cyclic guanidines, and combinations thereof; most preferably, cyclic guanidines and combinations thereof).

It has been discovered that the bases of the listed structural classes can effectively catalyze reaction between components (a) and (b), as described above. The bases (and their photoactivatable precursors) can be used in the curable composition singly (individually) or in the form of mixtures (including different structural classes).

Useful photoactivatable compositions include those that comprise at least one organoborate salt selected from tetraarylborate, triarylorganoborate, diaryldiorganoborate, and aryltriorganoborate salts (and combinations thereof) of at least one base selected from amidines, guanidines, phosphazenes, proazaphosphatranes, and combinations thereof. Such salts include those that comprise at least one organoborate anion ([BR'R$_3$]$^-$, wherein R' is aryl (for example, phenyl or naphthyl) or substituted aryl (which groups optionally can contain one or more heteroatoms such as, for example, nitrogen, sulfur, oxygen, halogen, and the like; for example, bearing one or more substituents such as chloro, bromo, fluoro, trifluoromethyl, ethyl, thio, and the like); and each R is independently an organic or heteroorganic group that is bonded to boron from a carbon atom) and at least one protonated base cation (AH+, wherein A represents the base, which comprises at least one nitrogen or phosphorus atom that can be protonated). Preferably, each R is independently selected from alkyl, aryl, alkaryl, allyl, aralkyl, alkenyl, alkynyl, cyano, cycloalkyl, and combinations thereof (which groups optionally can contain one or more heteroatoms such as, for example, nitrogen, sulfur, oxygen, halogen, and the like). The R' and R groups can have up to about 20 carbon atoms (preferably, up to about 12 carbon atoms; more preferably, up to about 8 carbon atoms). Preferred R groups include aryl, alkyl, cycloalkyl, combinations thereof (including aralkyl and alkaryl), and heteroatom-containing versions thereof (more preferably, aryl, alkyl, combinations thereof (including aralkyl and alkaryl), and heteroatom-containing versions thereof).

Preferred photoactivatable compositions comprise at least one organoborate salt selected from tetraarylborate, triarylorganoborate, and diaryldiorganoborate salts of the base, and combinations thereof (more preferably, selected from tetraarylborate and triarylorganoborate salts of the base, and combinations thereof; most preferably, selected from tetraarylborate salts of the base, and combinations thereof).

A class of useful organoborate salts includes those that are represented by the general formula

$$AH[BR^1R^2R^3R^4] \quad\quad\quad (III)$$

wherein R' is aryl or substituted aryl (for example, bearing one or more substituents such as chloro, bromo, fluoro, trifluoromethyl, ethyl, thio, and the like); $R^2$, $R^3$, and $R^4$ are organic or heteroorganic groups that are each independently selected from alkyl groups (for example, having from one to about 18 carbon atoms; preferably, from one to about 12 carbon atoms; more preferably, from one to about 6 carbon atoms; most preferably, ethyl, isopropyl, tert-butyl, and combinations thereof), substituted alkyl groups (for example, bearing one or more substituents such as chloro, bromo, fluoro, trifluoromethyl, thio, and the like), aryl groups (for example, having from 6 to about 14 carbon atoms; preferably, from 6 to about 10 carbon atoms; more preferably, from 6 to about 9 carbon atoms), substituted aryl groups (for example, bearing one or more substituents such as chloro, bromo, fluoro, trifluoromethyl, ethyl, thio, and the like), and combinations thereof; and A is at least one base selected from amidines, guanidines, phosphazenes, proazaphosphatranes, and combinations thereof. Preferably, $R^2$, $R^3$, and $R^4$ are each independently selected from aryl groups, substituted aryl groups, and combinations thereof. Preferred aryl groups include phenyl, substituted phenyl (for example, bearing two trifluoromethyl groups), and combinations thereof. Useful bases include those described below, with the below-described amidines and guanidines being preferred, the below-described cyclic amidines and cyclic guanidines being more preferred, and the below-described cyclic guanidines being most preferred.

Representative examples of useful organoborate salts include the triphenylethylborate, triphenylisopropylborate, triphenyl(tert-butyl)borate, diphenyldiethylborate, diphenylbis((methylthio)methyl)borate, phenyltris(tert-butylthio)methyl)borate, tetrakis[3,5-bis(trifluoromethyl)phenyl]borate, triphenyl[3,5-bis(trifluoromethyl)phenyl]borate, tetrakis(pentafluorophenyl)borate, tetrakis(trifluoromethylphenyl)borate, tetraphenylborate, and tetrakis(difluorophenyl)borate salts (and the like, and combinations thereof) of the bases described below. Preferred organoborate salts include tetraphenylborate, tetrakis[3,5-bis(trifluoromethyl)phenyl]borate, triphenyl[3,5-bis(trifluoromethyl)phenyl]borate, tetrakis(pentafluorophenyl)borate, tetrakis(trifluoromethylphenyl)borate, and tetrakis(difluorophenyl)borate salts (and combinations thereof) of the bases described below (more preferably, tetraphenylborate and tetrakis(trifluoromethylphenyl)borate salts (and combinations thereof) of the bases described below; most preferably, tetraphenylborate salts (and combinations thereof) of the bases described below). A particularly preferred photoactivatable composition comprises the tetraphenylborate salt of 1,5,7-triazabicyclo[4.4.0]dec-5-ene (TBD).

Useful photoactivatable compositions include those that, upon exposure to radiation, generate amidines that can be represented by the following general formula:

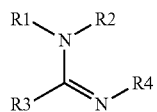

(IV)

wherein R1, R2, R3, and R4 are each independently selected from hydrogen, monovalent organic groups, monovalent heteroorganic groups (for example, comprising nitrogen, oxygen, phosphorus, silicon, or sulfur in the form of groups or moieties that are preferably bonded through a carbon atom and that do not contain acid functionality such as carboxylic or sulfonic), and combinations thereof; and wherein any two or more of R1, R2, R3, and R4 optionally can be bonded together to form a ring structure (preferably, a five-, six-, or seven-membered ring; more preferably, a six- or seven-membered ring). The organic and heteroorganic groups preferably have from 1 to about 20 carbon atoms (more preferably, from 1 to about 10 carbon atoms; most preferably, from 1 to about 6 carbon atoms). Preferably, R4 is not hydrogen.

Photoactivatable compositions that can generate amidines comprising at least one ring structure (that is, cyclic amidines) are generally preferred. Photoactivatable compositions that can generate cyclic amidines comprising two ring structures (that is, bicyclic amidines) are more preferred.

Representative examples of useful photoactivatable compositions include those that can generate amidine compounds such as 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and the like, and combinations thereof. Preferred photoactivatable compositions include those that can generate amidines such as 1,2-dimethyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and combinations thereof, with those that can generate DBU, DBN, and combinations thereof being more preferred and those that can generate DBU most preferred.

Useful photoactivatable compositions include those that, upon exposure to radiation, generate guanidines that can be represented by the following general formula:

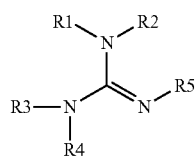

(V)

wherein R1, R2, R3, R4, and R5 are each independently selected from hydrogen, monovalent organic groups, monovalent heteroorganic groups (for example, comprising nitrogen, oxygen, phosphorus, silicon, or sulfur in the form of groups or moieties that are preferably bonded through a carbon atom and that do not contain acid functionality such as carboxylic or sulfonic), and combinations thereof; and wherein any two or more of R1, R2, R3, R4, and R5 optionally can be bonded together to form a ring structure (preferably, a five-, six-, or seven-membered ring; more preferably, a five- or six-membered ring; most preferably, a six-membered ring). The organic and heteroorganic groups preferably have from 1 to about 20 carbon atoms (more preferably, from 1 to about 10 carbon atoms; most preferably, from 1 to about 6 carbon atoms). Preferably, R5 is not hydrogen.

Photoactivatable compositions that can generate guanidines comprising at least one ring structure (that is, cyclic guanidines) are generally preferred. Photoactivatable compositions that can generate cyclic guanidines comprising two ring structures (that is, bicyclic guanidines) are more preferred. Representative examples of useful photoactivatable compositions include those that can generate guanidine compounds such as 1-methylguanidine, 1-n-butylguanidine, 1,1-dimethylguanidine, 1,1-diethylguanidine, 1,1,2-trimethylguanidine, 1,2,3-trimethylguanidine, 1,3-diphenylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, TBD (that is, 1,5,7-triazabicyclo[4.4.0]dec-5-ene), MTBD (that is, 7-methyl-1,5,7-triazabicyclo[4.4.0]dec-5-ene), 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, 7-decyl-1,5,7-triazabicyclo[4.4.0]dec-5-ene, biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisguanide, 1-[3-(diethylamino)propyl]biguanide, 1-[3-(dibutylamino)propyl]biguanide, N',N'''-dihexyl-3,12-diimino-2,4,11,13-tetraazatetradecanediamidine, and the like, and combinations thereof. Preferred photoactivatable compositions include those that can generate guanidines such as TBD (that is, 1,5,7-triazabicyclo[4.4.0]dec-5-ene), MTBD (that is, 7-methyl-1,5,7-triazabicyclo[4.4.0]dec-5-ene), 2-tert-butyl-1,1,3,3-tetramethylguanidine, and combinations thereof. More preferred photoactivatable compositions include those that can generate TBD, MTBD, and combinations thereof.

If desired, photoactivatable compositions that can generate amidines and/or guanidines exhibiting a pH value lower than 13.4 when measured according to JIS Z 8802 (for example, 1,3-diphenylguanidine, DBU, DBN, or a combination thereof; preferably, DBU, DBN, or a combination thereof) can be utilized. The referenced method for determining the pH of aqueous solutions, JIS Z 8802, is carried out by first preparing an aqueous solution of base by adding 5 millimoles of base to 100 g of a mixed solvent composed of isopropyl alcohol and water in a weight ratio of 10:3. The pH of the resulting solution is then measured at 23° C. using a pH meter (for example, a Horiba Seisakusho Model F-22 pH meter).

Useful photoactivatable compositions further include those that, upon exposure to radiation, generate phosphazenes that can be represented by the following general formula:

$$\begin{array}{c} R2 \diagdown \phantom{P} \diagup R1 \\ R3 \diagdown N \diagup \\ \phantom{R3} N - P = N - R7 \\ R4 \diagup \phantom{N} \diagdown \\ R5 \diagup \phantom{N} \diagdown R6 \end{array} \quad (VI)$$

wherein R1, R2, R3, R4, R5, R6, and R7 are each independently selected from hydrogen, monovalent organic groups, monovalent heteroorganic groups (for example, comprising nitrogen, oxygen, phosphorus, silicon, or sulfur in the form of groups or moieties that are preferably bonded through a carbon atom and that do not contain acid functionality such as carboxylic or sulfonic), and combinations thereof; and wherein any two or more of R1, R2, R3, R4, R5, R6, and R7 optionally can be bonded together to form a ring structure (preferably, a five-, six-, or seven-membered ring; more preferably, a five- or six-membered ring; most preferably, a six-membered ring). The organic and heteroorganic groups preferably have from 1 to about 20 carbon atoms (more preferably, from 1 to about 10 carbon atoms; most preferably, from 1 to about 6 carbon atoms). Preferably, R7 is not hydrogen.

Representative examples of useful photoactivatable compositions include those that can generate phosphazene compounds such as 1,1,1,3,3,3-hexakis(dimethylamino) diphosphazenium fluoride 1,1,1,3,3,3-hexakis(dimethylamino) diphosphazenium tetrafluoroborate 1,1,3,3,3-pentakis (dimethylamino)-$1\lambda^5$, $3\lambda^5$-diphosphazene 1-oxide 2-tert-butylamino-1-methyl-2-[tris(dimethylamino) phosphoranylidenamino]-perhydro-1,3,2-diazaphosphorinium iodide 2-tert-butylimino-2-diethylamino-1,3-dimethylperhydro-1,3,2-diazaphosphorine 2-tert-butylimino-2-diethylamino-1,3-dimethylperhydro-1,3,2-diazaphosphorine
n = 2 imino-tris(dimethylamino) phosphorane iminotris(dimethylamino) phosphonium tetrafluoroborate salt phosphazene base P₁-t-Bu phosphazene base P₁-t-Bu-tris (tetramethylene) purum phosphazene base P₁-t-Oct phosphazene base P₂-Et purum phosphazene base P₂-t-Bu phosphazene base P₂-t-Bu -continued

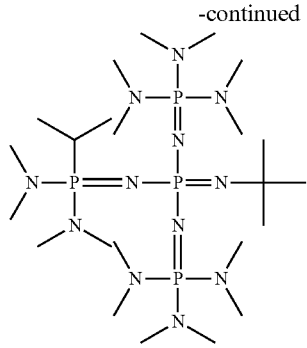

phosphazene base P₄-t-Bu

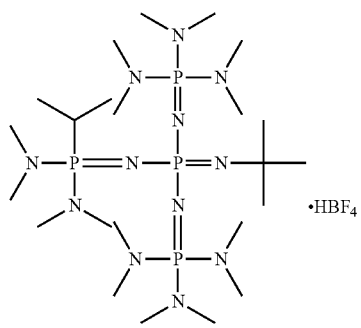

phosphazene base P₄-t-Bu tetrafluoroborate salt

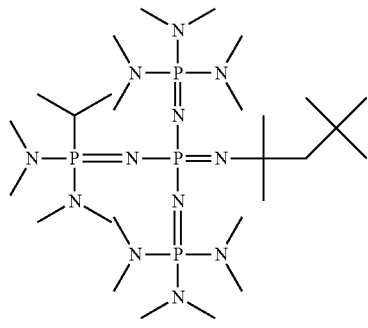

phosphazene base P₄-t-Oct

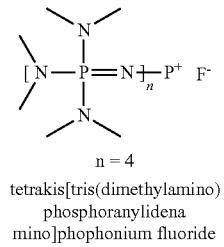

n = 4
tetrakis[tris(dimethylamino)
phosphoranylidena
mino]phophonium fluoride

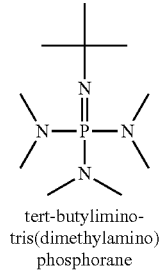

tert-butylimino-
tris(dimethylamino)
phosphorane and the like, and combinations thereof. Preferred photoactivatable compositions include those that can generate phosphazenes such as 2-tert-butylimino-2-diethylamino-1,3-dimethylperhydro-1,3,2-diazaphosphorine, phosphazene base P₁-t-Bu-tris(tetramethylene), phosphazene base P₄-t-Bu, and combinations thereof.

Useful photoactivatable compositions also further include those that, upon exposure to radiation, generate proazaphosphatrane bases (Verkade's bases) that can be represented by the following general formula:

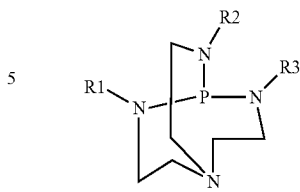

(VII)

wherein R1, R2, and R3 are each independently selected from hydrogen, monovalent organic groups, monovalent heteroorganic groups (for example, comprising nitrogen, oxygen, phosphorus, silicon, or sulfur in the form of groups or moieties that are preferably bonded through a carbon atom and that do not contain acid functionality such as carboxylic or sulfonic), and combinations thereof (less preferably hydrogen). The organic and heteroorganic groups preferably have from 1 to about 20 carbon atoms (more preferably, from 1 to about 10 carbon atoms; most preferably, from 1 to about 6 carbon atoms).

Representative examples of useful photoactivatable compositions include those that can generate proazaphosphatrane compounds such as

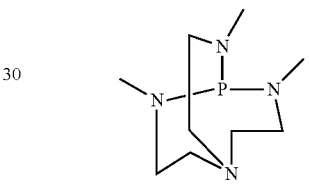

2,8,9-trimethyl-2,5,8,9-tetraaza-1-
phosphabicyclo[3.3.3]undecane

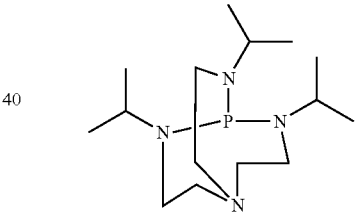

2,8,9-triisopropyl-2,5,8,9-tetraaza-1-
phosphabicyclo[3.3.3]undecane

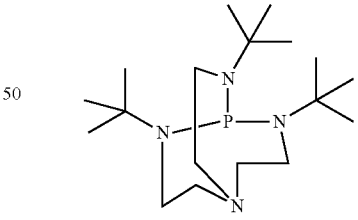

2,8,9-triisobutyl-2,5,8,9-tetraaza-1-
phosphabicyclo[3.3.3]undecane and the like, and combinations thereof. Preferred photoactivatable compositions include those that can generate 2,8,9-triisopropyl-2,5,8,9-tetraaza-1-phosphabicyclo[3.3.3]undecane.

Organoborate salts of the above-described bases can be prepared by known methods. For example, tetraphenylborate salts of the bases can be prepared by mixing hydrochloric acid, at least one of the bases, and sodium tetraphenylborate (which is commercially available) in water or methanol, followed by filtration, washing, recrystallization, and drying. Suitable preparative methods include those described by X. Sun et al. in "Bicyclic Guanidinium Tetraphenylborate: A Photobase Generator and A Photocatalyst for Living Anionic Ring-Opening Polymerization and Cross-Linking of Polymeric Materials Containing Ester and Hydroxy Groups," J. Am. Chem. Soc. 130, 8130 (2008) and by T. Rodima et al. in "Acid-Base Equilibria in Nonpolar Media. 2. Self-Consistent Basicity Scale in THF Solution Ranging from 2-Methoxypyridine to $EtP_1(pyrr)$ Phosphazene," J. Org. Chem. 67 (6), 1873 (2002), the descriptions of the methods being incorporated herein by reference.

The photoactivatable compositions can optionally (but preferably) further comprise at least one photosensitizer (for example, a compound having an absorption spectrum that overlaps or closely matches the emission spectrum of the radiation source to be used and that can improve the overall quantum yield by means of, for example, energy transfer or electron transfer to other component(s) of the photoactivatable composition). Useful photosensitizers include aromatic ketones (for example, substituted or unsubstituted benzophenones, substituted or unsubstituted thioxanthones, substituted or unsubstituted anthraquinones, and the like, and combinations thereof), dyes (for example, oxazines, acridines, phenazines, rhodamines, and the like, and combinations thereof), and the like, and combinations thereof. Preferred photosensitizers include aromatic ketones and combinations thereof (more preferably, substituted or unsubstituted benzophenones, substituted or unsubstituted thioxanthones, and combinations thereof; most preferably, substituted or unsubstituted benzophenones and combinations thereof). The amount of photosensitizer can vary widely, depending upon, for example, its nature, the nature of other component(s) of the photoactivatable composition, and the particular curing conditions. For example, amounts ranging from about 0.1 weight percent to about 0.5 weight percent can be useful for some applications.

Preparation of Curable Composition

The curable composition of the invention comprises components (a), (b), and (c). Preferably, the curable composition consists essentially of these three components (that is, the curable composition preferably comprises only dehydrogenatively-curable polysiloxane components).

The curable composition of the invention can be prepared by combining components (a), (b), and (c) in essentially any order (preferably, with agitation or stirring). Preferably, components (a) and (b) are combined initially, followed by addition of component (c). The composition can be maintained as a relatively shelf-stable, 1-part system (comprising all three components) in the substantial absence of radiation of an activating wavelength. The composition can be stable under such conditions for periods of up to, for example, days or weeks (a relatively long pot life), prior to coating or other application of the composition, with or without the addition of solvent (which is optional).

The relative amounts of components (a) and (b) can vary widely, depending upon their nature and the desired properties of the curable and/or cured composition. Although stoichiometry prescribes a 1:1 molar ratio of reactive silane functionality (for example, one mole of hydrosilyl moieties for every mole of hydroxysilyl moieties), in practice it can be useful to have a deficiency or an excess of hydrosilyl functionality (for example, this can be useful when cure inhibitors are present). Molar ratios of hydrosilyl moieties to hydroxysilyl moieties up to, for example, about 8:1 or about 13:1 or even as high as about 35:1 can be useful. Component (c) (the photoactivatable composition(s)) can be present in the curable composition in amounts ranging, for example, from about 0.1 to about 10 weight percent (preferably, from about 0.1 to about 5 weight percent; more preferably, from about 0.5 to about 2 weight percent), based upon the total weight of components (a), (b), and (c).

If desired, the curable composition can comprise at least one solvent or diluent to aid in storage stability, mixing, and/or coating, particularly when components (a) and (b) are polymeric. Suitable solvents for use in the curable composition of the invention include aprotic solvents such as aromatic solvents (for example, xylene, toluene, 1,2-dichlorobenzene, 1,3-dichlorobenzene, 1,4-dichlorobenzene, and the like, and mixtures thereof), ketones (for example, methyl ethyl ketone (MEK), cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Preferred solvents include aromatic solvents, alkanes, ketones, and mixtures thereof; with xylene, heptane, methyl ethyl ketone, and mixtures thereof being more preferred; and with methyl ethyl ketone and mixtures of methyl ethyl ketone and heptane being most preferred.

Minor amounts of optional components can be added to the curable composition to impart particular desired properties for particular curing methods or uses. Useful compositions can comprise conventional additives such as, for example, catalysts (including conventional condensation catalysts such as tin catalysts, which can be added as co-catalysts if desired), initiators, surfactants, stabilizers, thermal inhibitors, antioxidants, flame retardants, adhesion promoters, release modifiers (for example, silicate MQ resin), colorants, water scavengers, and the like, and mixtures thereof.

If desired, the curable composition can be prepared in the form of an emulsion (for example, by using water as a diluent), although such a form can be less preferred (for example, due to the potential occurrence of competing side reactions in the presence of water). Useful emulsifiers (also known as emulgents) include surface active substances or surfactants. Silicone emulsions often contain water, silicone oil, stabilizing surfactants, preservatives, and other additives for viscosity stabilization and freeze-thaw stability.

The curable composition of the invention can be prepared in the form of an emulsion by any of a variety of known or hereafter-developed mechanical or chemical emulsification techniques. Some suitable emulsions are also commercially available (for example, Syl-Off™ 1181 aqueous emulsion coating composition, available from Dow Corning Corporation, Midland, Mich.) and can be used in combination with the catalyst composition (component (c)). Useful emulsification techniques include those described, for example, in European Patent Applications Nos. 0 268 982 (Toray Silicone Company, Ltd.), 0 459 500 (Dow Corning Corporation), and 0 698 633 (Dow Corning Corporation), the descriptions of the techniques being incorporated herein by reference.

A particularly useful technique for producing silicone in water emulsions is that described in U.S. Pat. No. 6,013,682 (Dalle et al.), the technique description being incorporated herein by reference. This technique provides emulsions in which silicones polymerize by chain extension at the interior of silicone droplets suspended in water. U.S. Pat. No. 5,229,212 (Reed) describes another useful technique in which a high molecular weight, water-soluble or water-dispersible polymeric thickening agent (such as polyethylene oxide) is utilized, the description of the technique being incorporated herein by reference.

Suitable emulsifiers for use in the curable composition of the invention include non-ionic (including polymeric non-ionic surfactants (for example, alkylpolysaccharide)), cationic, anionic, and amphoteric surfactants, and the like, and combinations thereof. The surfactants can be used individually or in combination. Although essentially any type of surfactant can be used, non-ionic surfactants can be preferred.

Useful non-ionic surfactants include those that are rendered hydrophilic by the presence of a polyethylene glycol chain (obtained by the polycondensation of ethylene oxide). Such non-ionic surfactants are termed "polyethoxylated non-ionics." Other examples of useful non-ionic surfactants include polyalkenols (also known as polyvinyl alcohols), polyoxyalkylene alkyl ethers, polyoxyalkylene sorbitan alkyl esters, polyoxyalkylene alkyl esters, polyoxyalkylene alkylphenol ethers, polyethylene glycols, polypropylene glycols, diethylene glycols, polyethylene oxide-polypropylene oxide block copolymers, ethoxylated or sulfonated resins, carboxymethyl cellulose and other polysaccharide derivatives, polyacrylates, xanthane, and the like, and combinations thereof. Preferred non-ionic surfactants include polymeric non-ionic surfactants and combinations thereof (more preferably, polyalkenols and combinations thereof).

Examples of useful cationic surfactants include quaternary ammonium hydroxides (for example, tetramethylammonium hydroxide, octyltrimethylammonium hydroxide, dodecyltrimethylammonium hydroxide, hexadecyltrimethylammonium hydroxide, octyldimethylbenzylammonium hydroxide, decyldimethylbenzyl ammonium hydroxide, didodecyldimethylbenzyl ammonium hydroxide, dioctadecyldimethylammonium hydroxide, tallow trimethylammonium hydroxide, cocotrimethylammonium hydroxide, and the like, and combinations thereof), corresponding salts of the quaternary ammonium hydroxides, fatty acid amines and amides and their derivatives, salts of the fatty acid amines and amides (including aliphatic fatty amines and amides) and their derivatives, homologs of aromatic amines having fatty chains, fatty amides derived from aliphatic diamines, fatty amides derived from disubstituted amines, derivatives of ethylene diamine, amide derivatives of amino alcohols, amine salts of long-chain fatty acids, quaternary ammonium bases derived from fatty amides of disubstituted diamines, quaternary ammonium bases of benzimidazolines, basic compounds of pyridinium and its derivatives, sulfonium compounds, quaternary ammonium compounds of betaine, urethanes of ethylene diamine, polyethylene diamines, polypropanolpolyethanol amines, and the like, and combinations thereof.

Examples of useful anionic surfactants include alkylbenzene sulfonates (detergents), fatty acids (soaps), alkyl sulfates such as lauryl sulfate (foaming agents), di-alkyl sulfosuccinates (wetting agents), lignosulfonates (dispersants), and the like, and combinations thereof. Other useful anionic surfactants include those described in U.S. Pat. No. 6,013,682 (Dalle et al.), the descriptions thereof being incorporated herein by reference.

Another class of useful surfactants is that of amphoteric or zwitterionic surfactants, which include single surfactant molecules that exhibit both anionic and cationic dissociations. Examples of useful amphoteric surfactants include betaines, sulfobetaines, natural substances such as aminoacids and phospholipids, and the like, and combinations thereof.

The amount of surfactant that can be included in the curable composition of the invention will vary (for example, depending upon the nature of the surfactant(s)). Amounts of surfactant in the range of about 0.01 to about 35 weight percent (based upon the total weight of the curable composition), however, can often be useful (with amounts in the range of about 0.1 to about 20 weight percent being preferred, and amounts in the range of about 0.5 to about 5 or 10 weight percent being more preferred). The total amount of water that can be included in the curable composition to form an aqueous emulsion can also vary but generally can be in the range of about 20 to about 95 weight percent (based upon the total weight of the curable composition).

If desired, the catalyst composition (component (c)) can be pre-emulsified (for example, by addition of the catalyst composition to an aqueous solution of surfactant and/or thickening agent, followed by shaking or agitation of the resulting mixture) prior to its combination with the other components of the curable composition.

Use and Curing of Curable Composition

The curable composition of the invention can be used in various different applications. For example, the composition(s) can be used as sealants, release coatings, surface treatments, hardcoats, and the like. When used as fluorinated surface treatments, a degree of hydrophobicity and/or oleophobicity can be imparted to a variety of substrates (for example, for surface protection or to enhance ease of cleaning).

The curable composition of the invention (or, alternatively, its components) can be applied to at least a portion of at least one major surface of a substrate (for example, a sheet, a fiber, or a shaped object) by essentially any known or hereafter-developed application method, so as to form a variety of different coated articles. The composition can be applied in essentially any manner (and with essentially any thickness) that can form a useful coating.

Useful application methods include coating methods such as dip coating, spin coating, spray coating, wiping, roll coating, and the like, and combinations thereof. The composition can be applied in neat form or in the form of solvent solutions (for example, in solvents such as alkyl esters, ketones, alkanes, aromatics, and the like, and mixtures thereof). When solvent is used, useful concentrations of the composition can vary over a wide range (for example, from about 1 to about 90 weight percent), depending upon the viscosity of the composition, the application method utilized, the nature of the substrate, and the desired properties.

Substrates suitable for use in preparing the coated articles include those having at least one surface comprising a material that is solid and preferably substantially inert to any coating or application solvent that is used. Preferably, the curable composition can adhere to the substrate surface through chemical interactions, physical interactions, or a combination thereof (more preferably, a combination thereof).

Suitable substrates can comprise a single material or a combination of different materials and can be homogeneous or heterogeneous in nature. Useful heterogeneous substrates include coated substrates comprising a coating of a material (for example, a metal or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like), metals (for example, copper, silver, gold, aluminum, iron, stainless steel, nickel, zinc, and the like), metal alloys, metal compounds (for example, metal oxides and the like), leather, parchment, paper, textiles, painted surfaces, and combinations thereof. Preferred substrates include glass, minerals, wood, metals, metal alloys, metal compounds, polymers, paper, and combinations thereof (more preferably, paper, metals, metal alloys, metal compounds, polymers, and combinations thereof).

Preferred substrates include those used for pressure-sensitive adhesive (PSA) products. For example, the curable composition can be applied to suitable flexible or inflexible backing materials and then cured. Useful flexible backing materials include paper, Kraft paper, polyolefin-coated paper, plastic films (for example, poly(propylene), poly(ethylene), poly(vinyl chloride), polyester (including poly(ethylene terephthalate), polyamide, cellulose acetate, and ethyl cellulose), and the like, and combinations thereof, although essentially any surface requiring release toward adhesives can be utilized. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film, or ceramic sheet material. Primers can be utilized, but they are not always necessary.

The curable composition of the invention can provide coatings that are suitable for use in the manufacture of PSA-coated labels and tapes. The specific level of release provided upon curing can be controllably varied through variation in, for example, the weight percentage and molecular weight of component (a) of the composition, or through the addition of release modifiers (for example, silicate MQ resin), which also can be varied in nature and/or amount.

The curable composition can be cured by exposing at least a portion of the composition to radiation of an appropriate wavelength to activate the photoactivatable composition. The preferred curing conditions will vary, depending upon the particular application and its accompanying requirements and conditions. Moisture can be present but generally is not necessary.

The preferred radiation source and exposure time will vary depending upon, for example, the nature and amount of the photoactivatable composition. Sources of ultraviolet, visible, and/or infrared radiation can be useful (for example, wavelengths ranging from about 200 nm to about 650 or 700 nm or up to about 20,000 nm; preferably, ultraviolet radiation, visible radiation, or a combination thereof, depending upon the choice of photosensitizer). Suitable radiation includes sunlight and light from artificial sources, including both point sources and flat radiators.

Representative examples of useful radiation sources include carbon arc lamps; xenon arc lamps; medium-pressure, high-pressure, and low-pressure mercury lamps, doped if desired with metal halides (metal halogen lamps); microwave-stimulated metal vapor lamps; excimer lamps; superactinic fluorescent tubes; fluorescent lamps; incandescent argon lamps; electronic flashlights; xenon flashlights; photographic flood lamps; electron beams; X-rays, produced by means of synchrotrons or laser plasma; laser light sources (for example, excimer lasers); and the like; and combinations thereof. The distance between the radiation source and the coated substrate can vary widely, depending upon the particular application and the type and/or power of the radiation source (for example, distances ranging from about 2 cm to about 150 cm can be useful).

Cure generally can be effected by carrying out irradiation and/or subsequent processing of the coated substrate at temperatures ranging from room temperature (for example, about 20-23° C.) up to about 150° C. or more (preferably, temperatures of about 20° C. to about 125° C.; more preferably, about 20° C. to about 100° C.; most preferably, about 20° C. to about 80° C.). Curing times can range from a few seconds or less (for example, at room temperature with adequate amounts of catalyst and light exposure) to minutes or hours (for example, under low catalyst and/or low light conditions).

Release coatings obtained via cure of the curable composition of the invention generally contain little or no free silicone to adversely affect the tack and peel properties of PSAs that come in contact with them. The curable composition of the invention can cure relatively rapidly to provide relatively firmly anchored, highly crosslinked, solvent-resistant, tack-free coatings, which can be used with a broad range of PSA types (for example, acrylates, tackified natural rubbers, and tackified synthetic elastomers).

Articles in the form of PSA laminates (for example, comprising a layer of PSA borne on a release liner) can be prepared by placing a PSA layer in contact with the release coating through dry lamination, wet solution casting, or even by application of a photopolymerizable composition to the release coating, followed by irradiation to effect photopolymerization (for example, as described in U.S. Pat. No. 4,181, 752 (Martens et al.), the description of which is incorporated herein by reference). Such articles can exhibit relatively good storage stability (as evidenced, for example, by the results of room temperature and/or heat accelerated aging tests to evaluate any change in the level of release (peel force) from the release coating and/or in the subsequent level of adhesion to a desired substrate).

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis.

| Material | Description | Source |
| --- | --- | --- |
| Syl-Off™ 292 | A 30 weight percent solids dispersion of a blend of reactive hydroxysilyl-functional siloxane polymer(s) (said to comprise hydroxyl-terminated polydimethylsiloxane) and hydrosilyl-functional polysiloxane crosslinker (said to comprise poly(methyl)(hydrogen)siloxane) in xylene. This product is designed to provide premium release in most applications and is sold under the trade designation "Syl-Off™ 292." | Dow Corning Corporation, Midland, MI. |

-continued

| Material | Description | Source |
|---|---|---|
| DBU | 1,8-Diazabicyclo[5.4.0]undec-7-ene | Alfa Aesar, 26 Parkridge Road, Ward Hill, MA 01835 |
| TBD | 1,5,7-Triazabicyclo[4.4.0]dec-5-ene | Sigma-Aldrich Chemical Company, St. Louis, MO |
| Phosphazene Base P1-t-Bu-tris(tetramethylene) | 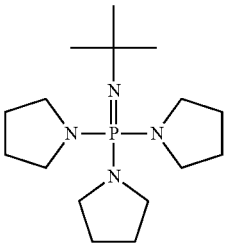 [SMILES: CC(C)(C)N=P(N1CCCC1)(N1CCCC1)N1CCCC1] | Sigma-Aldrich Chemical Company, St. Louis, MO |
| NaBPh$_4$ | | Sigma-Aldrich Chemical Company, St. Louis, MO |
| MeOH | Methanol (95 weight percent) | Alfa Aesar, 26 Parkridge Road, Ward Hill, MA 01835 |
| MEK | Methyl Ethyl Ketone | EMD, 480 South Democrat Road, Gibbstown, NJ 08027-1239 |
| Heptane | | Sigma-Aldrich Chemical Company, St. Louis, MO |
| Deuterated DMSO | Deuterated Dimethyl Sulfoxide | Sigma-Aldrich Chemical Company, St. Louis, MO |
| CHCl$_3$ | Chloroform | Alfa Aesar, 26 Parkridge Road, Ward Hill, MA 01835 |
| HCl | Hydrochloric Acid | Alfa Aesar, 26 Parkridge Road, Ward Hill, MA 01835 |

Preliminary Screening of Bases 1-10 and Comparative Bases C-1-C-12

A sample of a 30 weight percent solids dispersion of a blend of reactive hydroxysilyl-functional siloxane polymer(s) (said to comprise hydroxyl-terminated polydimethylsiloxane) and hydrosilyl-functional polysiloxane crosslinker (said to comprise poly(methyl)(hydrogen)siloxane) in xylene (a premium release coating composition obtained from Dow Corning Corporation, Midland, Mich., under the trade designation Syl-Off™ 292) was diluted to 10 weight percent solids with heptane. For each of Bases 1-10 and Comparative Bases C-1-C-12, 0.02 g of base (listed in Table 1 below; all bases were obtained from Aldrich Chemical Company, Milwaukee, Wis.) was added to 5 g of Syl-Off™ 292 solution (10 weight percent in heptane) and then mixed. The resulting mixtures were coated on the primed side of a 50 micrometer thick polyester terephthalate (PET) film (obtained from Mitsubishi Polyester Film, Greer, S.C., under the trade designation Hostaphan™ 3 SAB, referred to hereinafter as 3SAB PET film, which has one side chemically treated or primed to improve the adhesion of silicone coatings) using a number 4 Meyer rod. The resulting coated 3SAB PET samples were set aside at room temperature (about 23° C.) and their curing status (level of tackiness) was monitored. A coated sample was deemed cured if the coating solidified within 5 minutes. A coated sample was deemed not cured if the coating did not solidify and remained tacky for at least 24 hours at room temperature. The results of the base screening are shown in Table 1 below.

TABLE 1

| Base No. | Base | Curing |
|---|---|---|
| 1 | DBU (1,8-Diazabicyclo[5.4.0]undec-7-ene) 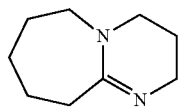 | Yes |
| 2 | DBN (1,5-Diazabicyclo[4.3.0]non-5-ene) 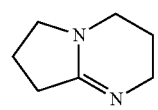 | Yes |

TABLE 1-continued

| Base No. | Base | Curing |
|---|---|---|
| 3 | 1,2-Dimethyl-1,4,5,6-tetrahydropyrimidine | Yes |
| 4 | TBD (1,5,7-Triazabicyclo[4.4.0]dec-5-ene) | Yes |
| 5 | MTBD (7-Methyl-1,5,7-triazabicyclo[4.4.0]dec-5-ene) | Yes |
| 6 | 2-tert-Butyl-1,1,3,3-tetramethylguanidine | Yes |
| 7 | Phosphazene base P₁-t-Bu-tris(tetramethylene) | Yes |
| 8 | Phosphazene base P₄-t-Bu solution (1M in Hexane) | Yes |
| 9 | 2-tert-Butylimino-2-diethylamino-1,3-dimethylperhydro-1,3,2-diazaphosphorine | Yes |
| 10 | 2,8,9-Triisopropyl-2,5,8,9-tetraaza-1-phosphabicyclo[3,3,3]undecane | Yes |
| C-1 | 1,1,3,3-Tetramethylguanidine | No |
| C-2 | N,N'-Diisopropylcarbodiimide | No |
| C-3 | N,N'-Dicyclohexylcarbodiimide | No |
| C-4 | Imidazole | No |
| C-5 | N-Methylimidazole | No |
| C-6 | 1,2-Dimethylimidazole | No |

TABLE 1-continued

| Base No. | Base | Curing |
|---|---|---|
| C-7 | 1,4-Diazabicyclo[2.2.2]octane | No |
| C-8 | 4,4'-Trimethylenebis(1-methylpiperidine) | No |
| C-9 | 2,6-Dimethylpyridine | No |
| C-10 | 4-Dimethylaminopyridine | No |
| C-11 | 2,2,6,6-Tetramethylpiperidine | No |
| C-12 | | No |

Test Methods $^{13}C$ and $^{1}H$ Nuclear Magnetic Resonance (NMR) Analysis

The sample was dissolved in deuterated dimethyl sulfoxide (DMSO). $^{13}C$ NMR spectra were acquired (on a Bruker AVANCE™ 500 MHz NMR spectrometer obtained from Bruker AXS Inc., Madison, Wis.). $^{1}H$ NMR spectra were acquired (on a Varian INOVA™ 500 MHz spectrometer obtained from Agilent Technologies, Inc., Santa Clara, Calif.).

Test Methods for Measuring Aged Release (Release Liner Adhesion) and Subsequent Adhesion (Readhesion)

These tests measured the effectiveness of release liners that had been aged for a period of time at a constant temperature and relative humidity. The aged release value is a quantitative measure of the force required to remove a flexible adhesive tape from the release liner at a specific angle and rate of removal. This force is expressed in Newtons per decimeter (N/dm). Unless otherwise noted, one of the following three adhesive tapes was used to measure the aged release value (release liner adhesion) and the subsequent adhesion (sometimes called readhesion) to a substrate.

Tape I is an acrylic pressure-sensitive adhesive tape comprising a polypropylene backing commercially available from 3M Company, St. Paul, Minn. under the trade designation Scotch™ Magic™ Tape 810.

Tape II is an acrylic pressure-sensitive adhesive tape comprising a polypropylene backing commercially available from 3M Company, St. Paul, Minn. under the trade designation Scotch™ Book Tape 845.

Tape III is a rubber adhesive tape comprising a crepe paper backing commercially available from 3M Company, St. Paul, Minn. under the trade designation Scotch™ High-Performance Masking Tape 232.

Release liners (release-coated substrates) of the invention were tested for their aged release values by lamination of one of the above-described adhesive tapes, with the release coating of the release liner facing the adhesive-bearing side of the tape. The resulting laminates were cut into test strips about 2.54 cm wide and approximately 12 cm long. The test strips were then aged for five days at a constant temperature and relative humidity (RH), as specified in the various examples below. The aged test strips were attached to the working platen of a slip/peel tester (IMASS Model SP2000, obtained from Instrumentors, Inc., Strongsville, Ohio) using a 2.54 cm wide double-coated adhesive paper tape (commercially available from 3M Company, St. Paul, Minn. under the trade designation 3M™ Double Coated Paper Tape 410B) applied to the release liner side of the test strip. The attached test strip was rolled once on the working platen with a 2 kg rubber roller. The adhesive tape of the test strip was then removed from the release liner by peeling at 180 degrees and a rate of 2.3 meters per minute (90 inches per minute), and the force required for removing the adhesive tape from the release liner was measured over a five-second data collection time.

All release tests were carried out in a facility at constant temperature (23° C.) and constant relative humidity (50 percent). At least two measurements were made for each example, and the data are reported as an average of all measurements. Measurements were made in grams-force/inch and converted to N/dm.

After peeling of the adhesive tape from the release liner, the subsequent (180 degree peel) adhesion of the adhesive tape was measured by adhering the freshly peeled adhesive tape (without the release liner) to a stainless steel test panel, with the adhesive-bearing side of the tape in contact with the panel. The adhered adhesive tape was rubbed down on the test panel, first using light thumb pressure and then with a 2 kg rubber roller at a rate of 61 cm per minute. The subsequent adhesion value of the tape was then measured using the above-described instrument and test parameters. These measurements were taken to determine whether a drop in adhesion value occurred due to undesirable contamination of the adhesive surface by the release coating of the release liner. The subsequent adhesion test was also carried out at 23° C. and 50 percent relative humidity. At least two measurements were made for each example, and the data are reported as an average of all measurements. Measurements were made in grams-force/inch and converted to N/dm.

Preparation of the Tetraphenylborate Salt of DBU (DBU.HBPh4)

1,8-Diazabicyclo[5.4.0]undec-7-ene (50 mmol, 7.6 g) was dissolved in 50 mL of 10 weight percent HCl (aqueous), and then 17.1 g (50 mmol) of NaBPh4 in 50 mL water was added. After 3 hours, the resulting precipitated salt was collected by filtration. The crude salt was washed several times with water, followed by a final washing with methanol (MeOH). The resulting product was recrystallized from a 4:1 mixture of MeOH and MEK and then dried in vacuo, giving 12.1 g of white needles.

Preparation of the Tetraphenylborate Salt of Phosphazene Base P1-t-Bu-tris(tetramethylene)
(P1-t-Bu-tris(tetramethylene).HBPh$_4$)

Phosphazene Base P1-t-Bu-tris(tetramethylene) (5 mmol, 1.56 g) was dissolved in 5 mL 10 weight percent HCl (aqueous), and then 1.71 g (5 mmol) of NaBPh4 in 5 mL water was added. After 3 hours, the resulting precipitated salt was collected by filtration. The crude salt was washed several times with water, followed by a final washing with MeOH. The resulting product was recrystallized from a 4:1 mixture of MeOH and MEK and then dried in vacuo, giving 1.6 g of white needles.

Preparation of the Tetraphenylborate Salt of TBD (TBD.HBPh4)

1,5,7-Triazabicyclo[4.4.0]dec-5-ene (10 mmol, 1.39 g) was dissolved in 10 mL of 10 weight percent HCl (aqueous). Then 3.42 g (10 mmol) of NaBPh4 in 10 mL water was added. After 3 hours, the resulting precipitated salt was collected by filtration. The crude salt was washed several times with water, followed by a final washing with MEOH. The resulting product was recrystallized from a 4:1 mixture of MeOH and CHCl$_3$ and then dried in vacuo, giving 2.2 g of colorless cubic crystal product with a melting point (mp) of 223-224° C. and a decomposition temperature ($T_{dec}$) of 251° C. The formation of the desired salt product was confirmed via $^{13}$C and $^1$H NMR analysis as described above. (The $^1$H NMR spectrum contained peaks at chemical shifts as follows:

1.80 (m, 4H), 3.16 (t, 4H), 3.26 (t, 4H), 6.78 (t, 4H), 6.92 (t, 8H), 7.17 (m, 8H); and the $^{13}$C NMR spectrum contained peaks at chemical shifts as follows: 20.7, 37.9, 40 (m), 46.7, 122, 125.7 (m), 136.)

Example 1

A sample of a 30 weight percent solids dispersion of a blend of reactive hydroxysilyl-functional siloxane polymer(s) (said to comprise hydroxyl-terminated polydimethylsiloxane) and hydrosilyl-functional polysiloxane crosslinker (said to comprise poly(methyl)(hydrogen)siloxane) in xylene (a premium release coating composition obtained from Dow Corning Corporation, Midland, Mich., under the trade designation Syl-Off™ 292) was diluted to 10 weight percent solids with MEK. 5 g of the resulting Syl-Off™ 292 solution (10 weight percent in MEK) was then mixed with 0.025 g of benzophenone and 0.025 g of DBU.HBPh$_4$ (prepared essentially as described above). The resulting mixture was coated on the primed side of a 50 micrometer thick polyester terephthalate (PET) film (obtained from Mitsubishi Polyester Film, Greer, S.C., under the trade designation Hostaphan™ 3 SAB, referred to hereinafter as 3 SAB PET film, which has one side chemically treated or primed to improve the adhesion of silicone coatings) using a number 4 rod. The resulting coated film was taped to a backer board and then passed twice through an ultraviolet (UV) process chamber (Model MC-6RQN, available from Fusion UV Systems, Inc., Gaithersburg, Md.) equipped with a 200 Watts per centimeter, mercury lamp (H-bulb) at a rate of 12 meters per minute. The lamp was positioned about 15 cm above the coated film. The UV process chamber was blanketed with nitrogen to lower the oxygen levels. Before entering the UV process chamber, the coating on the film was not cured and could be smeared off when rubbed by fingers. After the first pass through the UV process chamber, the coating was mostly cured but still could be scuffed off the film. After the second pass through the UV process chamber, the coating was cured and could not be scuffed off with finger pressure.

Example 2

Example 2 was run in essentially the same manner as Example 1 above, except that the coating mixture was prepared by mixing 0.023 g of benzophenone and 0.023 g of P1-t-Bu-tris(tetramethylene).HBPh$_4$ (prepared essentially as described above), instead of 0.025 g of benzophenone and 0.025 g of DBU.HBPh$_4$. All other ingredients and processes of Example 2 remained the same as in Example 1 above. The resulting coatings were cured after two passes and could not be scuffed off with finger pressure.

Example 3

Example 3 was prepared in essentially the same manner as Example 1 above, except that 0.10 g of TBD.HPh4 (prepared essentially as described above), 0.09 g of benzophenone, 3.42 grams of MEK, 13.67 g of heptane, and 7.81 of Syl-Off™ 292 were mixed in an 11 dram glass vial. The resulting mixture was coated on the primed side of a 50 micrometer thick polyester terephthalate (PET) film and placed in an oven at 80° C. for one minute before further curing by the process described above in Example 1. The resulting coating was cured well after two passes and could not be scuffed off with finger pressure.

Example 4

Example 4 was prepared in essentially the same manner as Example 1 above, except that 0.10 g of TBD.HPh4 (prepared essentially as described above), 0.09 g of benzophenone, 16.99 g of MEK, and 7.81 of Syl-Off™ 292 were mixed in an 11 dram glass vial. The resulting mixture was coated on the primed side of a 50 micrometer thick polyester terephthalate (PET) film and placed in an oven at 80° C. for one minute before further curing by the process described above in Example 1. The resulting coating was cured well after two passes and could not be scuffed off with finger pressure.

The coated and cured PET films of Examples 3 and 4 were tested for their aged release and subsequent adhesion (readhesion) after aging for 5 days at a relative humidity (RH) of 50 percent. The resulting data are presented below in Table 2.

TABLE 2

| Example No. | Tape | Release Liner Adhesion (N/dm) | | Readhesion (N/dm) | |
| --- | --- | --- | --- | --- | --- |
| | | Aging at 23° C. | Aging at 70° C. | Aging at 23° C. | Aging at 70° C. |
| 3 | Tape I | 0.39 | 1.01 | 27.51 | 22.68 |
| | Tape II | 0.32 | 0.81 | 32.88 | 40.30 |
| | Tape III | 0.76 | 3.12 | 36.68 | 46.44 |
| 4 | Tape I | 0.25 | 0.62 | 33.93 | 25.42 |
| | Tape II | 0.32 | 0.68 | 41.94 | 32.57 |
| | Tape III | 0.58 | 0.93 | 36.99 | 47.95 |

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

We claim:
1. A curable composition comprising
(a) at least one polyorganosiloxane, fluorinated polyorganosiloxane, or combination thereof comprising reactive silane functionality comprising at least two hydroxysilyl moieties;
(b) at least one polyorganosiloxane, fluorinated polyorganosiloxane, or combination thereof comprising reactive silane functionality comprising at least two hydrosilyl moieties; and
(c) at least one photoactivatable composition comprising at least one organoborate salt selected from tetraarylborate, triarylorganoborate, diaryldiorganoborate, and aryltriorganoborate salts (and combinations thereof) of at least one base selected from amidines, guanidines, phosphazenes, proazaphosphatranes, and combinations thereof;
wherein at least one of said components (a) and (b) has an average reactive silane functionality of at least three.

2. The composition of claim 1, wherein said components (a) and (b) each comprise at least one polyorganosiloxane.

3. The composition of claim 2, wherein said polyorganosiloxane comprises polymethylsiloxane.

4. The composition of claim 1, wherein said component (a) is hydroxyl-endblocked.

5. The composition of claim 1, wherein said component (a) is selected from polysiloxanes that are represented by the following general formula:

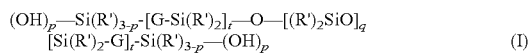

(OH)$_p$—Si(R')$_{3-p}$-[G-Si(R')$_2$]$_t$—O—[(R')$_2$SiO]$_q$ [Si(R')$_2$-G]$_t$-Si(R')$_{3-p}$—(OH)$_p$  (I)

wherein each p is independently an integer of 1, 2, or 3; each G is independently a divalent linking group; each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; q is an integer of 0 to 15,000; and each t is independently an integer of 0 or 1.

6. The composition of claim 1, wherein said component (a) comprises a mixture of (1) at least one polyorganosiloxane, fluorinated polyorganosiloxane, or combination thereof having a weight average molecular weight in the range of 300,000 to 1,000,000 and (2) at least one polyorganosiloxane, fluorinated polyorganosiloxane, or combination thereof having a weight average molecular weight in the range of about 150 to about 150,000.

7. The composition of claim 1, wherein said component (b) has an average reactive silane functionality of at least three.

8. The composition of claim 1, wherein said component (b) is selected from polysiloxanes that are represented by the following general formula:

R'$_2$R"SiO(R'$_2$SiO)$_r$(HR'SiO)$_s$SiR"R'$_2$  (II)

wherein each R' is independently selected from alkyl, alkenyl, fluoroalkyl, aryl, fluoroaryl, cycloalkyl, fluorocycloalkyl, heteroalkyl, heterofluoroalkyl, heteroaryl, heterofluoroaryl, heterocycloalkyl, heterofluorocycloalkyl, and combinations thereof; each R" is independently hydrogen or R'; r is an integer of 0 to 150; and s is an integer of 2 to 150.

9. The composition of claim 1, wherein said photoactivatable composition comprises at least one organoborate salt selected from tetraarylborate, triarylorganoborate, and diaryldiorganoborate salts of at least one said base, and combinations thereof.

10. The composition of claim 1, wherein said photoactivatable composition comprises at least one organoborate salt selected from tetraarylborate and triarylorganoborate salts of at least one said base, and combinations thereof.

11. The composition of claim 1, wherein said photoactivatable composition comprises at least one organoborate salt selected from tetraarylborate salts of at least one said base, and combinations thereof.

12. The composition of claim 1, wherein the organo groups of said organoborate salt are each independently an organic or heteroorganic group that is bonded to boron from a carbon atom.

13. The composition of claim 1, wherein said organoborate salt is selected from those that are represented by the general formula

AH[BR$^1$R$^2$R$^3$R$^4$]  (III)

wherein R$^1$ is aryl or substituted aryl; R$^2$, R$^3$, and R$^4$ are organic or heteroorganic groups that are each independently selected from alkyl groups, substituted alkyl groups, aryl groups, substituted aryl groups, and combinations thereof; and A is at least one base selected from amidines, guanidines, phosphazenes, proazaphosphatranes, and combinations thereof.

14. The composition of claim 13, wherein said R$^2$, R$^3$, and R$^4$ are each independently selected from aryl groups, substituted aryl groups, and combinations thereof; and/or said base is selected from amidines, guanidines, and combinations thereof.

15. The composition of claim 13, wherein said aryl groups are phenyl groups; said substituted aryl groups are substituted phenyl groups; and/or said base is selected from cyclic amidines, cyclic guanidines, and combinations thereof.

16. The composition of claim 1, wherein said photoactivatable composition comprises the tetraphenylborate salt of 1,5,7-triazabicyclo[4.4.0]dec-5-ene (TBD).

17. The composition of claim 1, wherein said photoactivatable composition further comprises at least one photosensitizer; wherein said composition is an organometallic catalyst-free composition; wherein said composition is solventless; and/or wherein said composition has been cured.

18. A coating process comprising
(a) providing the curable polysiloxane composition of claim 1;
(b) providing at least one substrate having at least one major surface;
(c) applying said curable polysiloxane composition to at least a portion of at least one said major surface of said substrate; and
(d) inducing said curable polysiloxane composition to cure to form a coating by exposing at least a portion of said curable polysiloxane composition to radiation.

19. An article comprising at least one substrate having at least one major surface, said substrate bearing, on at least a portion of at least one said major surface, a coating prepared by the coating process of claim 18.

20. A curable composition comprising
(a) at least one polyorganosiloxane, fluorinated polyorganosiloxane, or combination thereof that is hydroxyl-endblocked;
(b) at least one polyorganosiloxane, fluorinated polyorganosiloxane, or combination thereof comprising at least three hydrosilyl moieties; and (c) at least one photoactivatable composition comprising at least one tetraarylborate salt of at least one base selected from 1,5,7-triazabicyclo[4.4.0]dec-5-ene (TBD), 7-methyl-1,5,7-triazabicyclo[4.4.0]dec-5-ene (MTBD), 2-tert-butyl-1,1,3,3-tetramethylguanidine, 1,8-diazabicyclo[5.4.0]-7-undecene (DBU), 1,5-diazabicyclo[4.3.0]-5-nonene (DBN), 1,2-dimethyl-1,4,5,6-tetrahydropyrimidine, and combinations thereof.

* * * * *

UNITED STATES PATENT AND TRADEMARK OFFICE
CERTIFICATE OF CORRECTION

PATENT NO.       : 9,035,008 B2
APPLICATION NO.  : 14/368515
DATED            : May 19, 2015
INVENTOR(S)      : Yang et al.

It is certified that error appears in the above-identified patent and that said Letters Patent is hereby corrected as shown below:

In the Specification

Column 13

Line 43-50 (Approx.) (Structure), Delete " 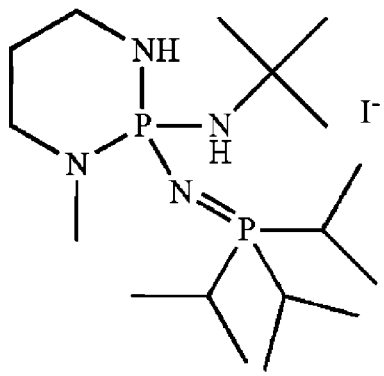 " and insert

-- 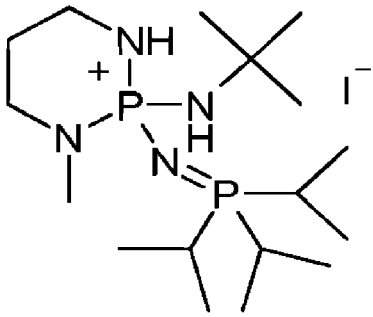 --, therefor.

Signed and Sealed this
Fifth Day of April, 2016

Michelle K. Lee
*Director of the United States Patent and Trademark Office*

CERTIFICATE OF CORRECTION (continued)
U.S. Pat. No. 9,035,008 B2

Column 14

Line 2-9 (Approx.) (Structure), Delete " 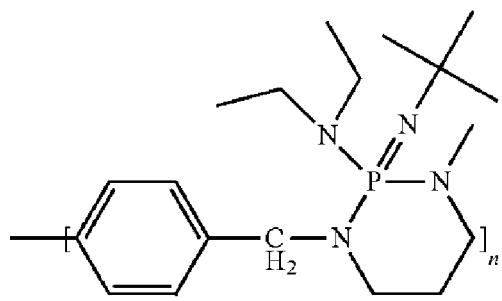 " and insert

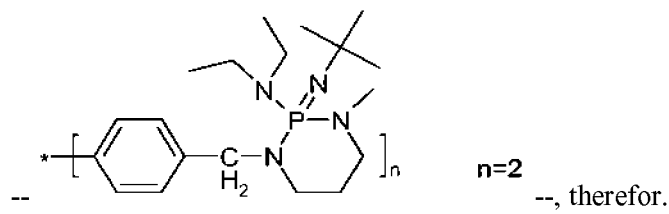 --, therefor.

Column 15

Line 1-13 (Approx.) (Structure), Delete " 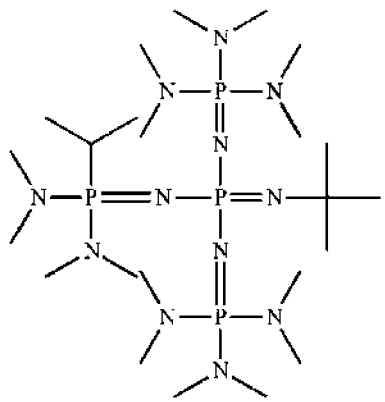 " and insert

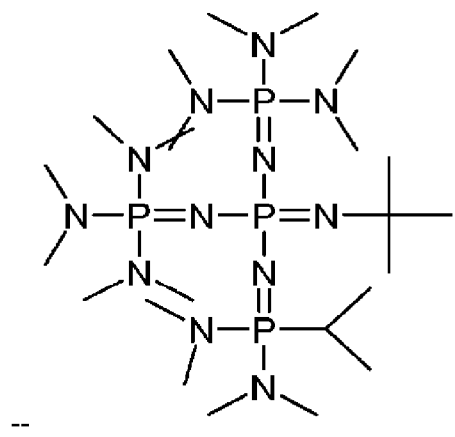 --, therefor.

Column 15
Line 16-26 (Approx.) (Structure), Delete " 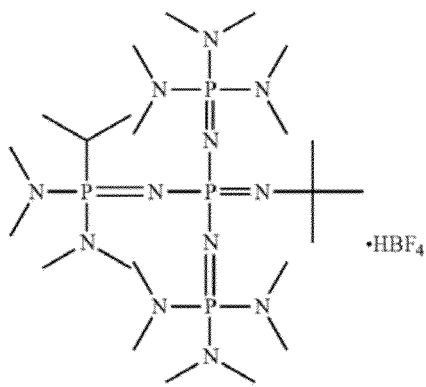 " and insert
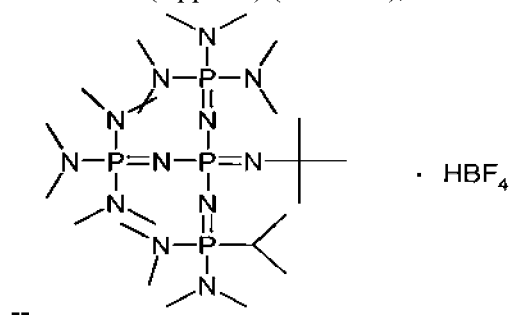 --, therefor.
Column 15
Line 31-42 (Approx.) (Structure), Delete " 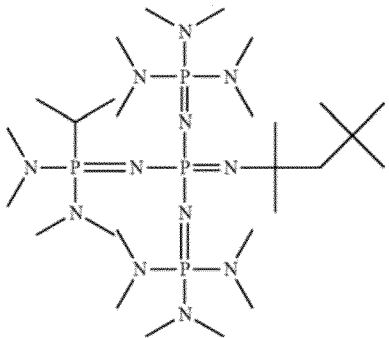 " and insert
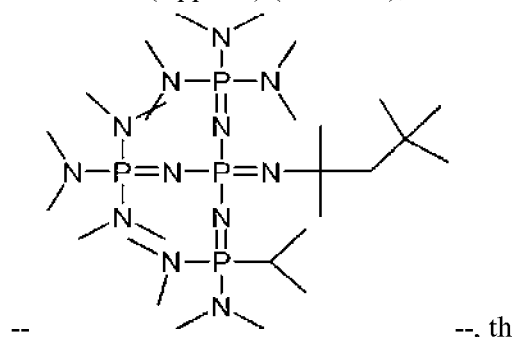 --, therefor.
Column 23
Line 62, Delete "3 SAB," and insert -- 3SAB, --, therefor.

Column 25
Line 53-65 (Approx.) (Structure 8), Delete " 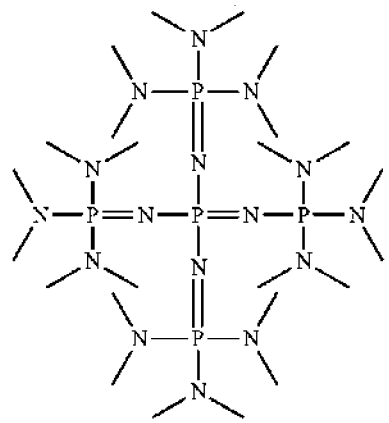 " and insert -- 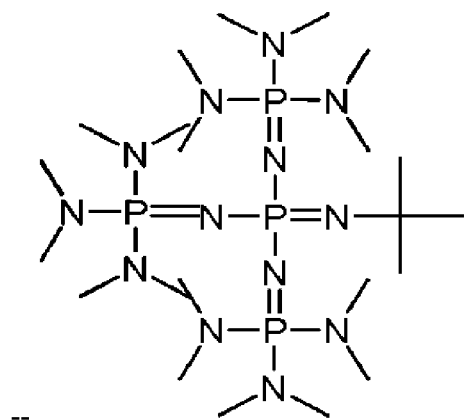 --, therefor.
Column 26
Line 8-15 (Approx.) (Structure 9), Delete " 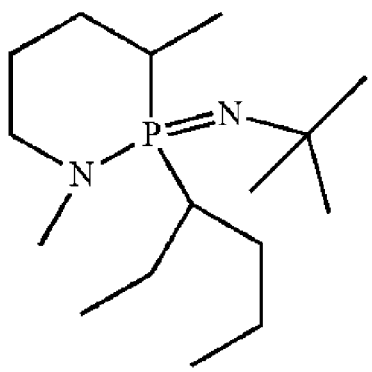 [SMILES: CCCC(CC)P1(=NC(C)(C)C)C(C)CCCN1C] " and insert -- 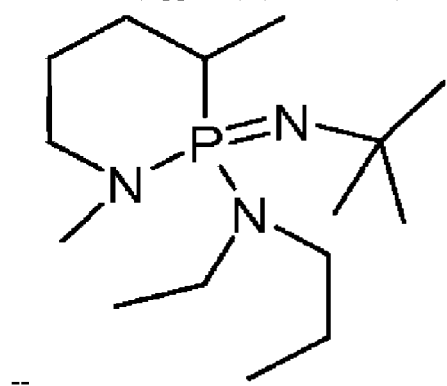 --, therefor.

CERTIFICATE OF CORRECTION (continued)
U.S. Pat. No. 9,035,008 B2

Column 27

Line 63, Delete "Newtons" and insert -- Newton --, therefor.

Column 29

Line 53, Delete "3 SAB," and insert -- 3SAB, --, therefor.

Column 29

Line 54, Delete "3 SAB" and insert -- 3SAB --, therefor.